(12) United States Patent
Henkelmann et al.

(10) Patent No.: US 11,236,848 B2
(45) Date of Patent: Feb. 1, 2022

(54) LINE ELEMENT WITH AIR GAP INSULATION

(71) Applicant: Westfalia Metal Hoses GmbH, Hilchenbach (DE)

(72) Inventors: Michael Henkelmann, Hilchenbach (DE); Karsten Schenk, Schwalmstadt (DE); Stefan Hauk, Hilchenbach (DE)

(73) Assignee: Westfalia Metal Hoses GmbH, Hilchenbach (DE)

( * ) Notice: Subject to any disclaimer, the term of this patent is extended or adjusted under 35 U.S.C. 154(b) by 0 days.

(21) Appl. No.: 16/923,832

(22) Filed: Jul. 8, 2020

(65) Prior Publication Data

US 2021/0010621 A1 Jan. 14, 2021

(30) Foreign Application Priority Data

Jul. 9, 2019 (DE) ..................... 10 2019 118 579.3

(51) Int. Cl.
*F16L 11/20* (2006.01)
*F16L 59/06* (2006.01)
*F16L 11/16* (2006.01)
*F16L 11/15* (2006.01)

(52) U.S. Cl.
CPC ............ *F16L 11/20* (2013.01); *F16L 11/15* (2013.01); *F16L 11/16* (2013.01); *F16L 59/06* (2013.01)

(58) Field of Classification Search
CPC .. F16L 11/20; F16L 11/15; F16L 11/16; F16L 59/06
USPC ....................................................... 138/113
See application file for complete search history.

(56) References Cited

U.S. PATENT DOCUMENTS

| 4,509,447 | A | * | 4/1985 | Smith, Sr. | B21C 37/154 114/65 R |
| 4,570,678 | A | * | 2/1986 | Ziemek | F16L 59/065 138/113 |
| 6,234,163 | B1 | * | 5/2001 | Garrod | F16L 11/20 126/307 R |
| 6,346,671 | B1 | * | 2/2002 | Ahrens | H01B 11/1834 174/28 |
| 7,226,243 | B2 | * | 6/2007 | Lee | F16L 59/143 405/154.1 |
| 7,770,602 | B2 | * | 8/2010 | Buschhoff | F16L 9/18 138/114 |
| 9,470,343 | B2 | * | 10/2016 | Herro | F16L 9/19 |
| 9,915,380 | B2 | * | 3/2018 | Gardner | H02G 1/14 |
| 10,041,620 | B2 | * | 8/2018 | Balmer | F16L 27/111 |
| 10,598,304 | B2 | * | 3/2020 | Strunk | B32B 1/08 |

(Continued)

FOREIGN PATENT DOCUMENTS

| DE | 196 28 797 | 1/1998 |
| DE | 102008001297 | 10/2008 |

(Continued)

*Primary Examiner* — Craig M Schneider
*Assistant Examiner* — David R Deal
(74) *Attorney, Agent, or Firm* — Henry M. Feiereisen LLC

(57) ABSTRACT

A line element for an exhaust pipe includes an inner hose, and an outer hose which is disposed in surrounding relation to the inner hose such as to form an intermediate space. At least one of the inner and outer hoses is formed from a wound profiled band. The band includes a radial projection which projects into the intermediate space and forms a spacer between the inner hose and the outer hose.

15 Claims, 6 Drawing Sheets

(56) References Cited

U.S. PATENT DOCUMENTS

| | | | | |
|---|---|---|---|---|
| 2004/0216795 A1* | 11/2004 | Schippl | ............... | F16L 59/125 |
| | | | | 138/112 |
| 2009/0139596 A1* | 6/2009 | Kuyl | ................... | G01M 3/283 |
| | | | | 138/148 |
| 2015/0136268 A1* | 5/2015 | Soika | .................... | F16L 11/20 |
| | | | | 138/121 |

FOREIGN PATENT DOCUMENTS

| | | |
|---|---|---|
| DE | 102010004809 | 7/2011 |
| DE | 102011053131 | 5/2012 |
| DE | 102012018470 | 3/2013 |
| DE | 102011121383 | 6/2013 |
| DE | 102018122658 | 3/2020 |

* cited by examiner

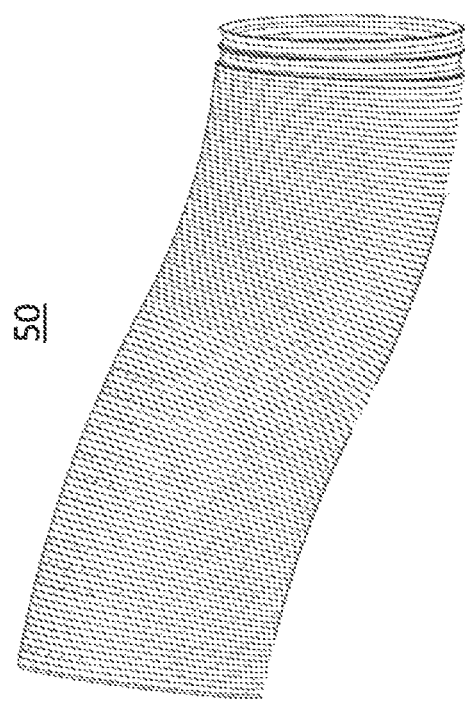
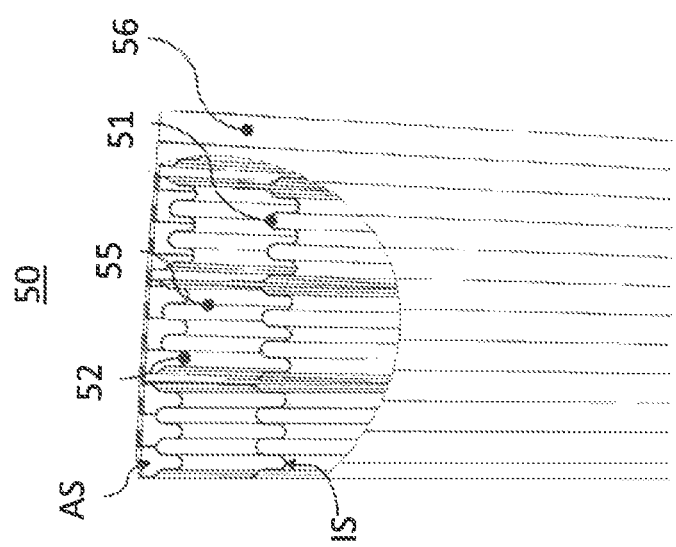
Fig. 5
Fig. 5a

LINE ELEMENT WITH AIR GAP INSULATION

CROSS-REFERENCES TO RELATED APPLICATIONS

This application claims the priority of German Patent Application, Serial No. DE 10 2019 118 579.3, filed Jul. 9, 2019, pursuant to 35 U.S.C. 119(a)-(d), the disclosure of which is incorporated herein by reference in its entirety as if fully set forth herein.

BACKGROUND OF THE INVENTION

The present invention relates to a line element with air gap insulation.

The following discussion of related art is provided to assist the reader in understanding the advantages of the invention, and is not to be construed as an admission that this related art is prior art to this invention.

A line element of a type involved here may in particular be used to transport without causing leakage hot, gaseous media which significantly differ in temperature (>200° C.) from the ambient temperature. Typically, such a line element is installed in exhaust systems of internal combustion engines, primarily in the region of the exhaust gas conduction between the turbo outlet and the entry to the exhaust gas aftertreatment. Thermal insulation of this region of the exhaust system gains increasingly importance. A driving factor involves legal regulations worldwide in relation to the exhaust gas region so as to significantly lower emissions of cars and commercial vehicles. Exhaust systems are increasingly being equipped with aftertreatment modules, such as soot particle filters and SCR systems. Functionality of the exhaust gas aftertreatment depends to a large extent on the temperature of the exhaust gas at which it enters the aftertreatment. This applies in SCR systems to the catalytic reaction, which should lead to an almost complete reduction of the nitrogen oxides as soon as possible after the starting process. In the case of the particle filter, passive regeneration can only take place when a minimum exhaust gas temperature is exceeded. Active regeneration, e.g. initialized by injecting unburned diesel into the exhaust system, also works more effectively the higher the exhaust gas temperatures. As a result, temperature losses in the exhaust gas from its path from the turbo outlet to the inlet in the aftertreatment are required to be minimized. This applies in particular to the cold start phase. It is important to keep the cold start phase as short as possible through appropriate measures so as to realize an effective aftertreatment of the exhaust gases in a quickest possible way once the engine has started.

Legislation is another driving factor for reducing fleet consumption and the associated reduction in carbon dioxide emissions. In diesel vehicles in particular, there is a trend towards lower exhaust gas temperatures, since such a combustion process results in lower fuel consumption. Therefore, a lower exhaust gas temperature will require even better thermal insulation in the future so that the aftertreatment remains effective.

It would therefore be desirable and advantageous to provide an improved line element with air gap insulation to obviate prior art shortcomings.

SUMMARY OF THE INVENTION

According to one aspect of the present invention, a line element for an exhaust pipe includes an inner hose, and an outer hose disposed in surrounding relation to the inner hose such as to form an intermediate space, at least one of the inner and outer hoses being formed from a wound profiled band, with the band including a radial projection which projects into the intermediate space and forms a spacer between the inner hose and the outer hose.

According to another advantageous feature of the present invention, the profiled band may be made of metal. When forming the inner hose from a profiled band, the radial projection extends radially outwards toward the outer hose to ensure a defined minimum distance between inner and outer hoses. In addition or as alternative, when the outer hose is formed by the profiled band, the radial projection extends radially inwards toward the inner hose to ensure a defined minimum distance between inner and outer hoses.

The radial projection extends in a radial direction over the corresponding base diameter (inner diameter of the outer hose or outer diameter of the inner hose), with the base diameter being established in the case of a corrugated hose at the point of the troughs or crests of the "normal" hose geometry. While the radial projection may only be provided locally at one spot, it is advantageous to extend the radial extension continuously along the entire band and thus also helically in the entire intermediate space. An intermediate form to these variants may involve the provision of several local radial projections, for example at equidistant intervals along the entire band.

Since one or more radial projections can be formed on the band, any reference to "the radial projection" in the following description is to be understood as relating to "at least one of the one or more radial projections".

According to another advantageous feature of the present invention, the inner hose or the outer hose or both the inner and outer hoses can be configured gas-tight.

According to another advantageous feature of the present invention, at least one of the inner and outer hoses can be embodied as a spiral-wound bellows. Bellows are spiral-wound elements connected in the edge area of the profile and have helical corrugations in relation to the rotation axis. A wound bellows structure may advantageously be hooked in a form-fitting manner or overlap or welded in a material interconnecting manner.

According to another advantageous feature of the present invention, at least one of the inner and outer hoses may have a wave-shaped varying diameter between two neighboring radial projections formed thereon. Currently preferred is a configuration in which at least one of the inner and outer hoses has a substantially constant diameter between adjacent radial projections.

The radial projection, as view in axial section, can be formed basically at any point on the band, for example in the central region of the band. Advantageously, the radial projection can be formed at an axial edge of the band.

According to another advantageous feature of the present invention, the band has axial ends which can each be formed with a radial projection, with abutting radial projections of neighboring hose turns being connected with one another, e.g. welded.

According to another advantageous feature of the present invention, both the inner hose and the outer hose can be formed from wound profiled bands, e.g. in the form of a spirally-wound bellows. The profiled bands have windings with a pitch, with the pitch of the windings of the inner hose and the pitch of the windings of the outer hose being identical.

According to another advantageous feature of the present invention, the inner and outer hoses can be screwed within each another. This is particularly possible when both the inner and outer hoses are made with a spiral-wound geometry and the pitches of the geometries are essentially the same. Screwing the inner and outer hoses into one another results in a particularly stable configuration.

According to another advantageous feature of the present invention, provision may be made for a thermal insulation material to fill the intermediate space between the inner and outer hoses. In addition to thermal insulation, the presence of the thermal insulation material assists in stabilizing and stiffening the construction.

In addition or as an alternative, the inner hose and/or the outer hose can also have a thermally insulating coating.

According to another advantageous feature of the present invention, the inner hose has a wall thickness and the outer hose has a wall thickness which can be different than the wall thickness of the inner hose. Advantageously, the wall thickness of the inner hose is smaller than the wall thickness of the outer hose. The ratio of the wall thicknesses of the inner hose to the outer hose is typically in the range from 1:N, with N>1 (preferably N=2; 3; 4; 5; 6; 8; 9 or 10). For example, the inner hose can have a wall thickness of approximately 0.2 mm and the outer hose can have a wall thickness of approximately 0.5 mm (N=2.5).

According to another advantageous feature of the present invention, the radial projection can have a free (distal) end which can be bent. In this way, the presence of a sharp outer edge is prevented. The free end may be bent back by 180° to form, for example, an open U-shaped configuration or may have sections that bear upon one another to effect a doubling of material.

According to another advantageous feature of the present invention, provision may be made for a band material to wrap an outer side of the outer hose. As a result, the construction is further stabilized and an additional thermal insulation can be realized. Advantageously, the band material can be wrapped around the outer side of the outer hose such as to form a further intermediate space between the band material and the outer hose.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 is a sectional view of a line element according to the present invention, wrapped on the outside with a band material;

FIG. 5a is a perspective view of the line element of FIG. 5; and

DETAILED DESCRIPTION OF PREFERRED EMBODIMENTS

Figure 1:
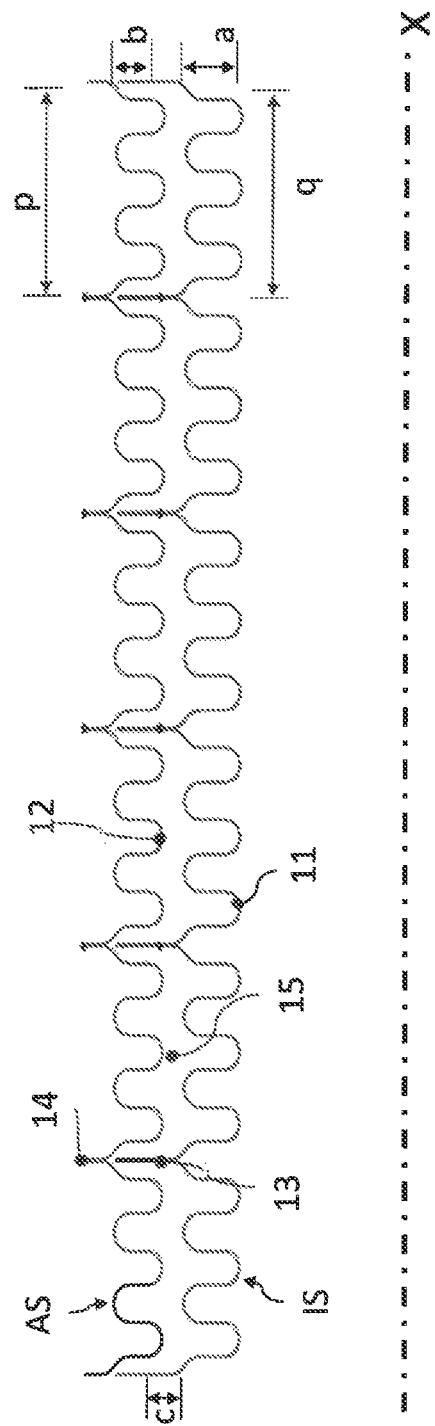
FIG. 1 is an axial section of a first embodiment of a line element according to the present invention through one of its walls along its axial extent (hose center axis X), depicting the line element with a corrugated bellows structure as basic geometry.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an axial section of a first embodiment of a line element according to the present invention, generally designated by reference numeral 10. The line element 10 includes two spiral-wound bellows geometries to define bands 11 and 12, respectively, which can be rotated into one another and form an inner hose IS and an outer hose AS, respectively. The bellows geometries (bands 11, 12) are initially profiled through rolling flat metal strips (band), which are then rounded and welded on the outer circumference, similar to a diaphragm bellows.

In the non-limiting example of FIG. 1, the outer bellows geometry 12, representing the outer hose AS, has three turns with a radial height b. A helical weld is applied in a zone 14 of abutting edges of adjacent band turns. The pitch of the helical curve corresponds to a profile width and is indicated by p in FIG. 1. The inner bellows geometry 11, representing the inner hose IS, has also three turns with a radial height a, with the distance of the crests from a hose center axis X defining a base outer diameter of the inner hose IS. A helical weld is applied in a zone 13 of abutting edges of adjacent band turns. The pitch of the helix corresponds to the profile width and is indicated by q in FIG. 1.

Both bellows geometries 11, 12 are initially manufactured separately from one another and then rotated into one another. A resulting air gap, which defines an intermediate space 15, is helical and is sealed gas-tight both towards the inside of the exhaust gas flow and towards the outside. Advantageously, the intermediate space 15 can be filled with insulation material. For example, a foam-shaped, hardening (for example metallic) insulation material can be introduced with the assistance of an injection device. The presence of bellows corrugations results in a mobility which can be used for bending and, if necessary, for stretching and compressing.

Figure 2:
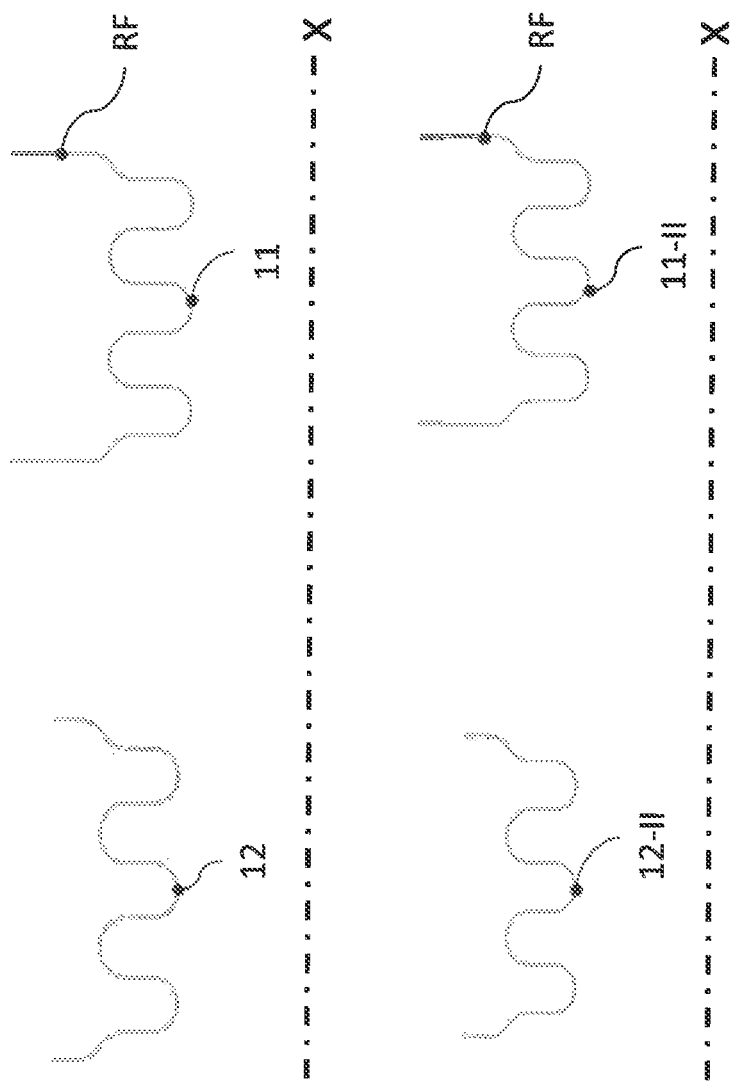
FIG. 2 is an axial section through different band geometries of bands that can be used to produce a line element according to the present invention.

As is readily apparent from FIG. 2, both axial edges of the band 11 of the inner hose IS have radial projections RF which extend in the finished line element 10 radially beyond the base outer diameter of the inner hose IS into the intermediate space 15 and engage in crests of the outer hose AS.

The radial web length of the inner band 11 with the radial projections RF in the zones 13 define a radial height of the air gap, also during and after bending into the final geometry.

Since both bellows geometries (bands 11, 12) are rotated into one another, the pitches p and q are advantageously identical. The same applies also for the corrugation heights a and b and for the number of turns across the profile widths p and q.

Furthermore, FIG. 2 shows two different embodiments in the outer region or at the end of the profile. The bands 11 and 12 describe a simply formed profile shape, whereas the bands 11-II and 12-II have a sheet metal fold in the outer region. The latter improve haptics and reduce structural tensions during operation.

The sheet thicknesses of both bellows geometries can be selected independently of one another. The rotating into each other and the firm fit can be optimized through suitable constructive measures. Advantageously, the sheet thickness of the outer bellows geometry is significantly greater than the sheet thickness of the inner bellows geometry, for example in a ratio of 1:2 to 1:3. In this way, the outer bellows geometry creates stability, structural integrity, resistance to natural frequencies and protection against road influences such as, e.g., rockfall. Advantageously, the inner bellows geometry has a minimal sheet thickness. The minimum sheet thickness also results in a minimal heat capacity. In this way, the heat-up time of the inner sheet metal layer contacting the exhaust gas flow is short and the line element 10 according to the present invention contributes to a rapid fully functional aftertreatment following a short cold start phase.

Sheet thicknesses, profile widths and corrugation heights of the geometry according to the invention are variable, so that heat and pressure losses can be optimized over the length of the line element 10.

Figure 3:
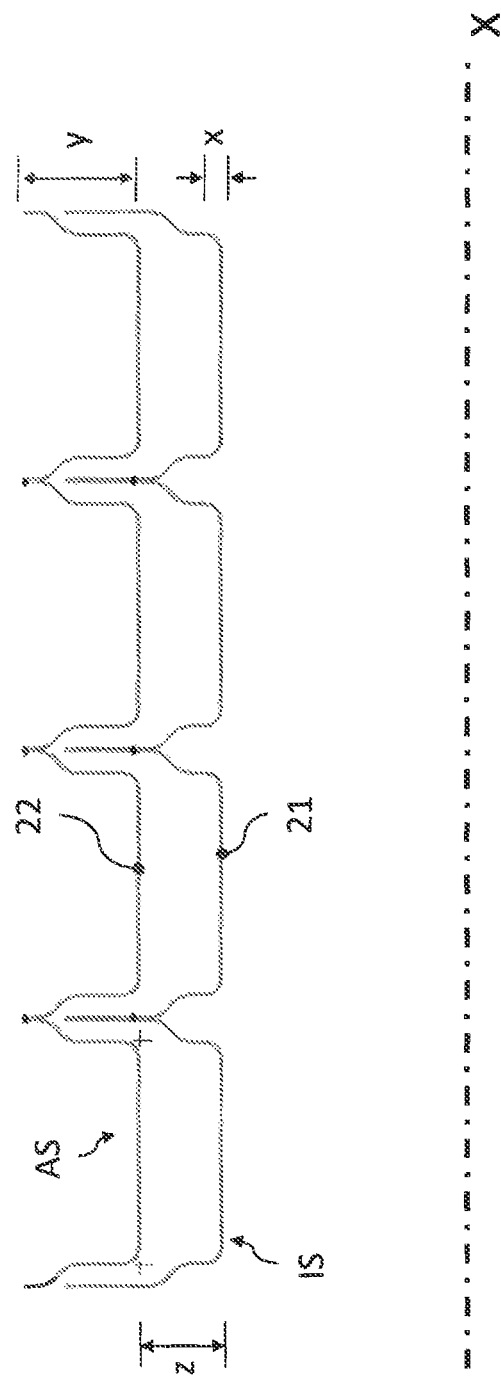
FIG. 3 is an axial section of a second embodiment of a line element according to the present invention through one of its walls along its axial extent (hose center axis X), depicting the line element with a substantially flat structure as basic geometry.

FIG. 3 shows an axial section of a second embodiment of a line element according to the present invention, generally designated by reference numeral 20. The line element 20 includes two spiral-wound bellows geometries produced from bands 21 and 22, respectively, which can be rotated into one another and form inner hose IS and an outer hose AS, respectively. The wound profiled bands 21, 22 have each a substantially flat structure between their edges. The abutting edges of the bands 21 and 22 form one corrugation per turn. The corrugation height of each winding (between the abutting edges) is zero. In particular for straight line sections, the air gap insulated line element 20 can be designed to be weight-optimized and to save resources. Optionally, only the inner hose IS or the outer hose AS can be designed with a corrugation height of zero.

Figure 4:
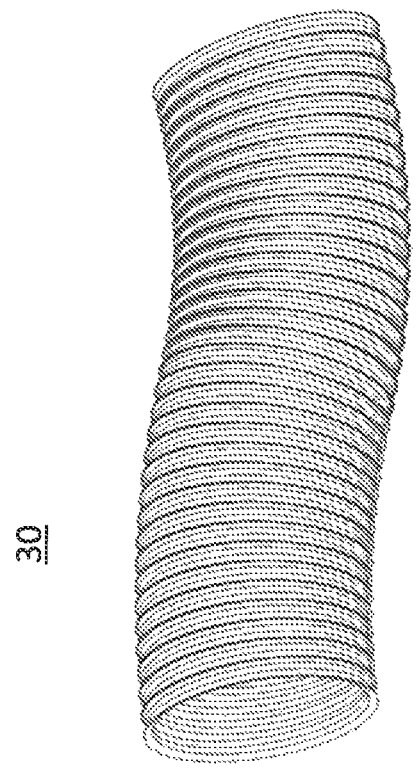
FIG. 4 is a sectional view of a line element according to the present invention with spatial bend.
Figure 4A:
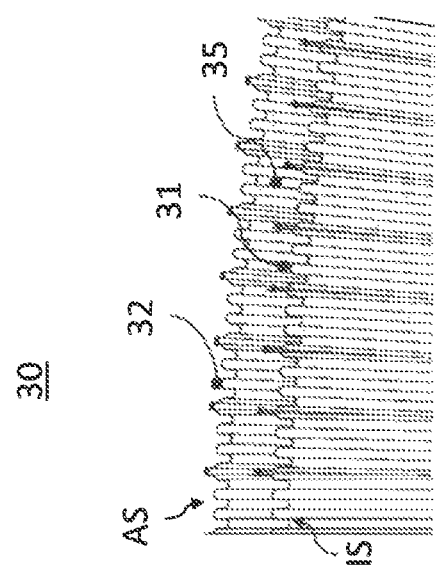
FIG. 4a is a perspective view of the line element of FIG. 4.

FIG. 4 shows a sectional view of an air gap insulated line element according to the present invention, generally designated by reference numeral 30 and including inner band 31 and outer band 32, after the line element 30 has been bent into the final geometry. The air gap, defining an intermediate space between the inner hose IS and the outer hose AS is designated with reference numeral 35. The differences in diameter in the corrugations influence a pressure loss over the length. FIG. 4a shows a perspective illustration of the line element 30.

FIG. 5 shows a sectional view of an air-gap-insulated line element according to the present invention, generally designated by reference numeral 50 and including inner band 51 and outer band 52, after being bent into the end geometry and mechanically reinfored by wrapping the outer band 52 on the outside with a band material 56. The air gap, defining an intermediate space between the inner hose IS and the outer hose AS is designated with reference numeral 55.

The band material 56 is made of temperature-resistant band, e.g. fiberglass rovings. Other examples of band material, though not exhaustive, are listed hereinafter which are suitable for use at high temperatures:

Nonwovens made of E-glass, pre-ceramic materials or metal-textile composite materials,
Knitted bands made of E-glass, pre-ceramic materials or metal-textile composite materials,
Knitted elements made of graphite fibers in combination with absorbent fibers.

In a further step, the wound bands 51, 52 can be impregnated with a curable liquid. Examples include polyester, vinyl ester resins or epoxy resins. Ceramic materials such as, e.g., CBPC (Chemically Bonded Phosphate Ceramics) may also find application. The production can be implemented by a parallel or cross-winding process. In this way, the mechanical strength can be optimized. A second air gap created under the wound layer between the band material 56 and the outer band 52 increases the insulation capacity. FIG. 5a shows a perspective illustration of the line element 50.

Figure 6:
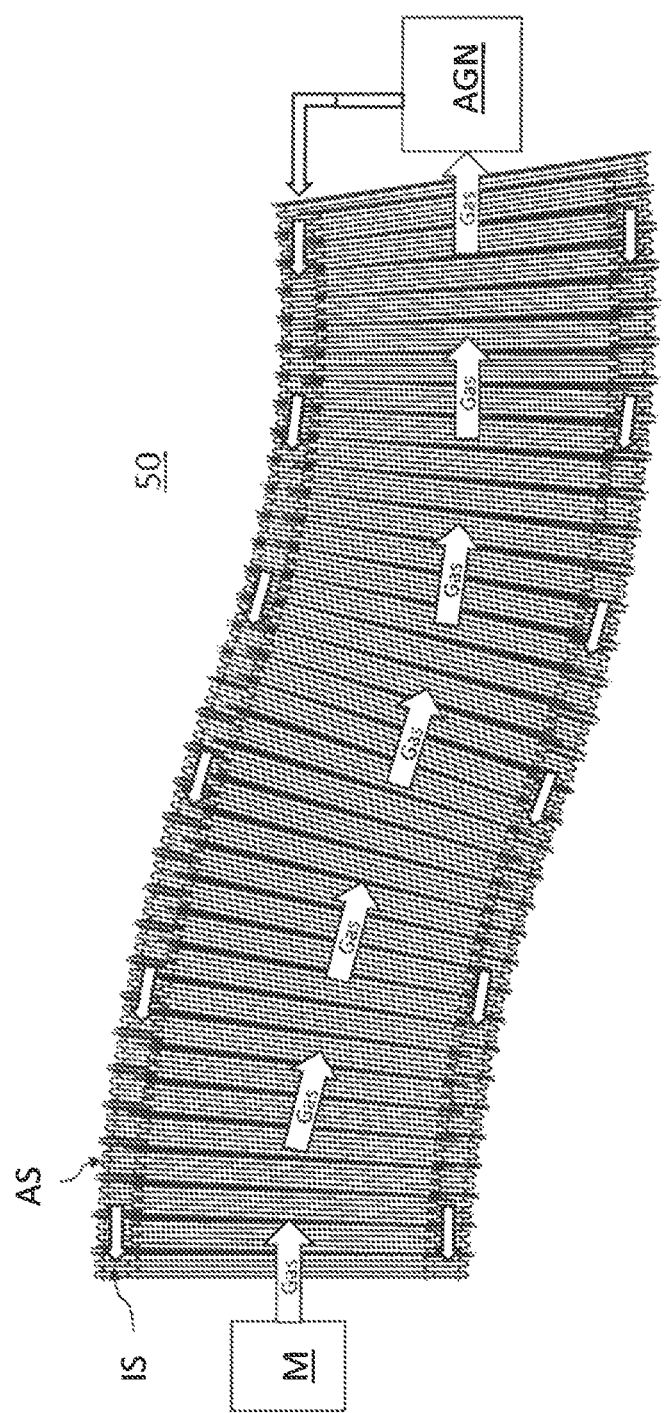
FIG. 6 is a schematic illustration of a flow of exhaust gas through an intermediate space of a line element.

FIG. 6 shows the air gap insulated line element 50 with connections for special media that are introduced into the air gap 55 (FIG. 5). Advantageously, the exhaust gas flow upstream of the air gap insulated line element 50 is split to improve the insulation effect. The helical air gap 55 has a significantly greater length than the internal exhaust gas path. A split of the exhaust gas flow with a branch into the air gap 55 thus hypothetically leads to a higher flow velocity and to a lower pressure in the area of the air gap 55. This can have a positive effect on insulation properties.

While FIG. 6 shows a counterflow of exhaust gas, generated by the engine M, in the inner hose IS and in the intermediate space 55, the exhaust gas can also be conducted in parallel flow. Furthermore, the exhaust gas can optionally be rerouted between the engine M and the line element 50, after the line element 50 and prior to an exhaust gas aftertreatment system AGN, or after the exhaust gas aftertreatment system AGN.

It is also possible to actively influence the exhaust gas temperature by conducting a heating or cooling medium through the air gap.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A line element for an exhaust pipe, said line element comprising:
    an inner hose; and
    an outer hose disposed in surrounding relation to the inner hose such as to form an intermediate space,
    at least one of the inner hose and the outer hose being formed from a wound profiled band, said band including radial projections formed at opposing axial ends the band and projection into the intermediate space and forming a spacer between the inner hose and the outer hose, with abutting radial projections of neighboring hose turns being connected with one another.

2. The line element of claim 1, wherein at least on of the inner and outer hoses is embodied as a spiral-wound bellows.

3. The line element of claim 1, wherein at least one of the inner and outer hoses has a constant diameter between adjacent radial projections.

4. The line element of claim 1, wherein both the inner hose and the outer hose are formed from wound profiled bands having windings with a pitch.

5. The line element of claim 4, wherein the pitch of the windings of the inner hose and the pitch of the windings of the outer hose are identical.

6. The line element of claim 4, wherein the inner and outer hoses are screwed into one another.

7. The line element of claim 1, further comprising a thermal insulation material filling the intermediate space between the inner and outer hoses.

8. The line element of claim 1, wherein the inner hose has a wall thickness and the outer hose has a wall thickness which is different than the wall thickness of the inner hose.

9. The line element of claim 8, wherein the wall thickness of the inner hose is smaller than the wall thickness of the outer hose.

10. The line element of claim 1, wherein the radial projection has an end which is bent.

11. The line element of claim 1, further comprising a band material wrapping an outer side of the outer hose.

12. The line element of claim 11, wherein the band material is wrapped around the outer side of the outer hose such as to form a further intermediate space between the band material and the outer hose.

13. The line element of claim 1, wherein the line element has a spatial bend.

14. The line element of claim 1, wherein the radial projections are integrally formed at the opposing axial ends the band.

15. The line element of claim 1, wherein the abutting radial projections of neighboring hose turns are connected by welding.

* * * * *